July 1, 1958 F. ADAM 2,841,252
JAIL LOCKING DEVICES, AND THE LIKE
Filed Oct. 15, 1953 11 Sheets-Sheet 1
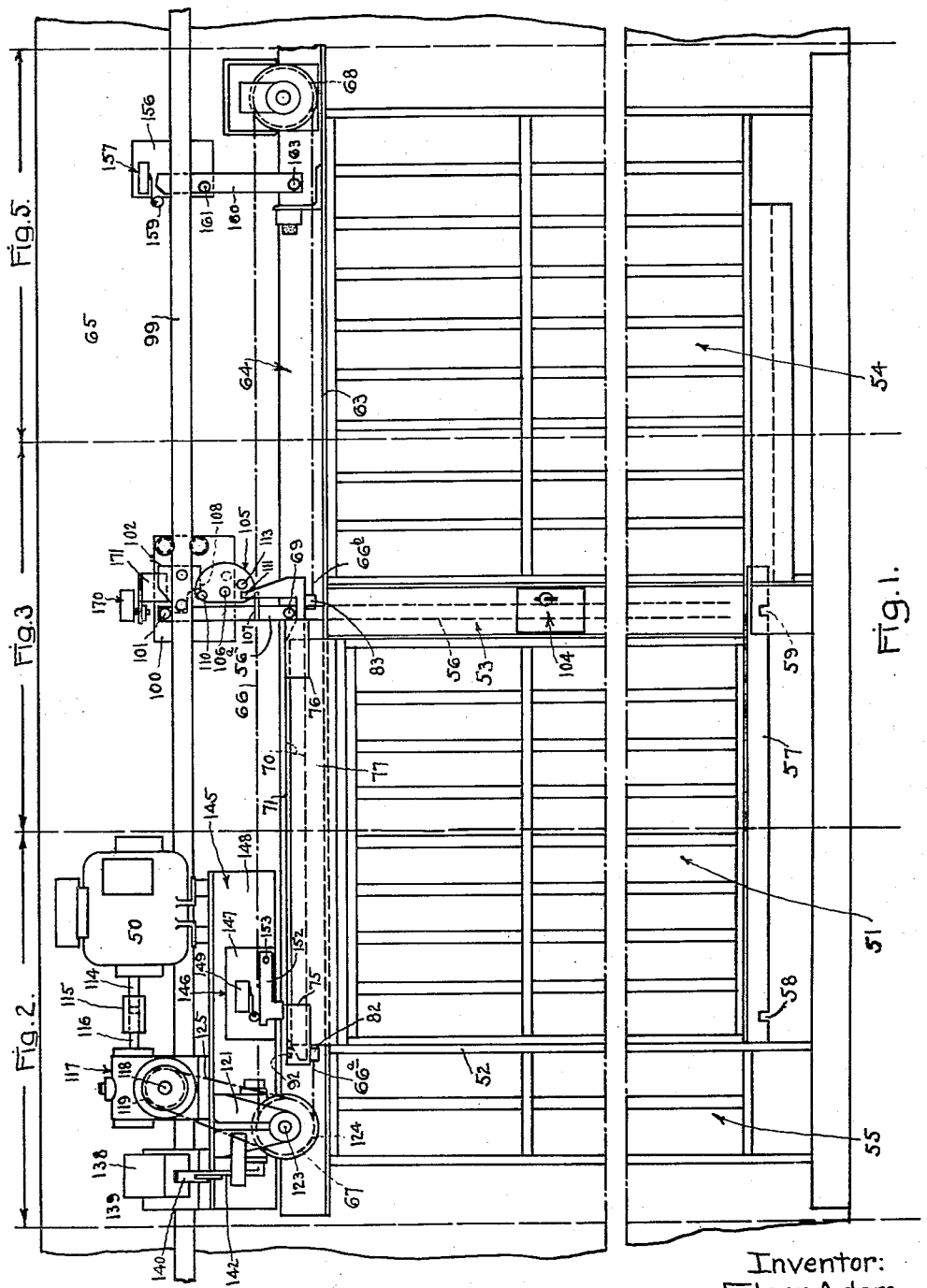
Inventor:
Folger Adam

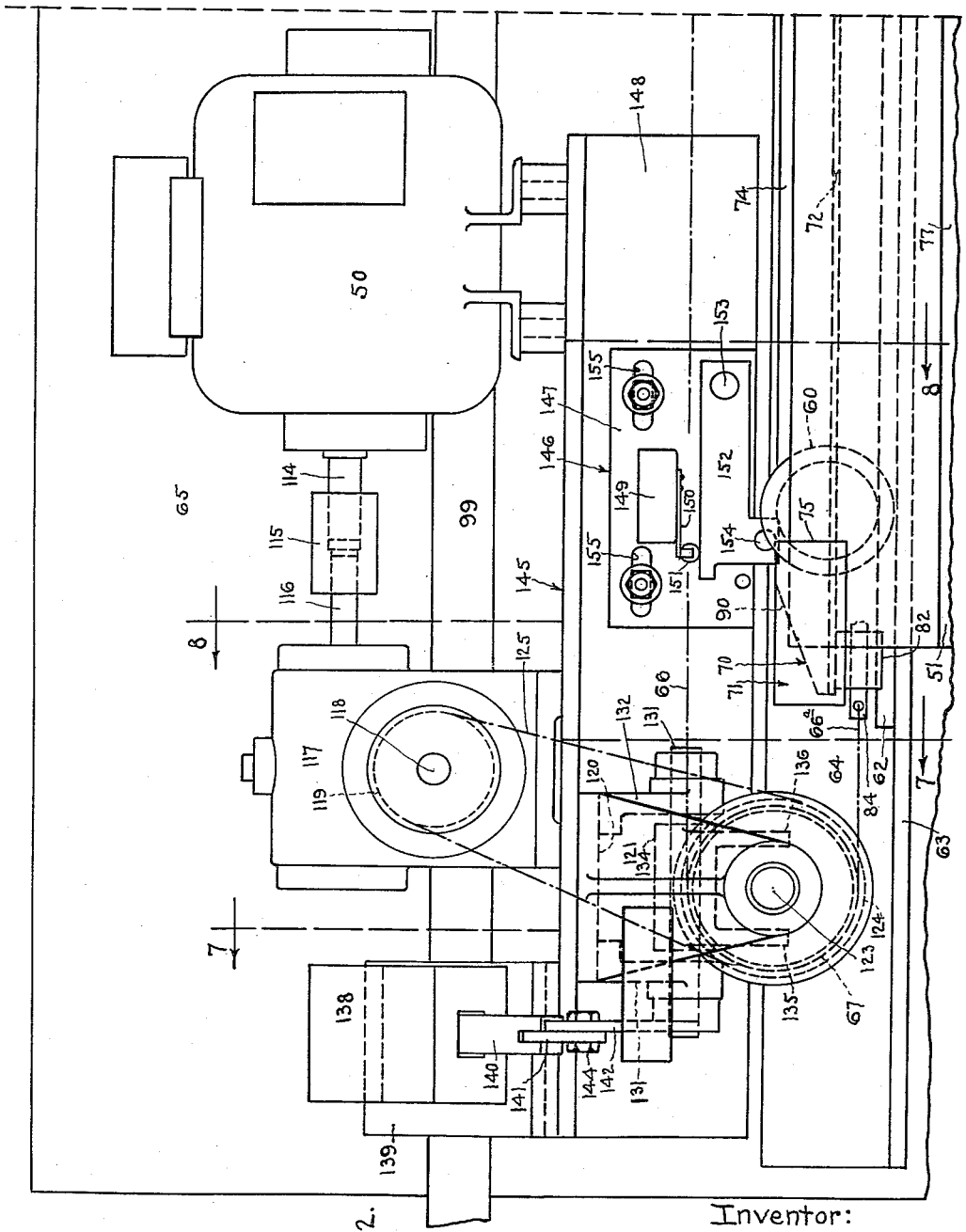

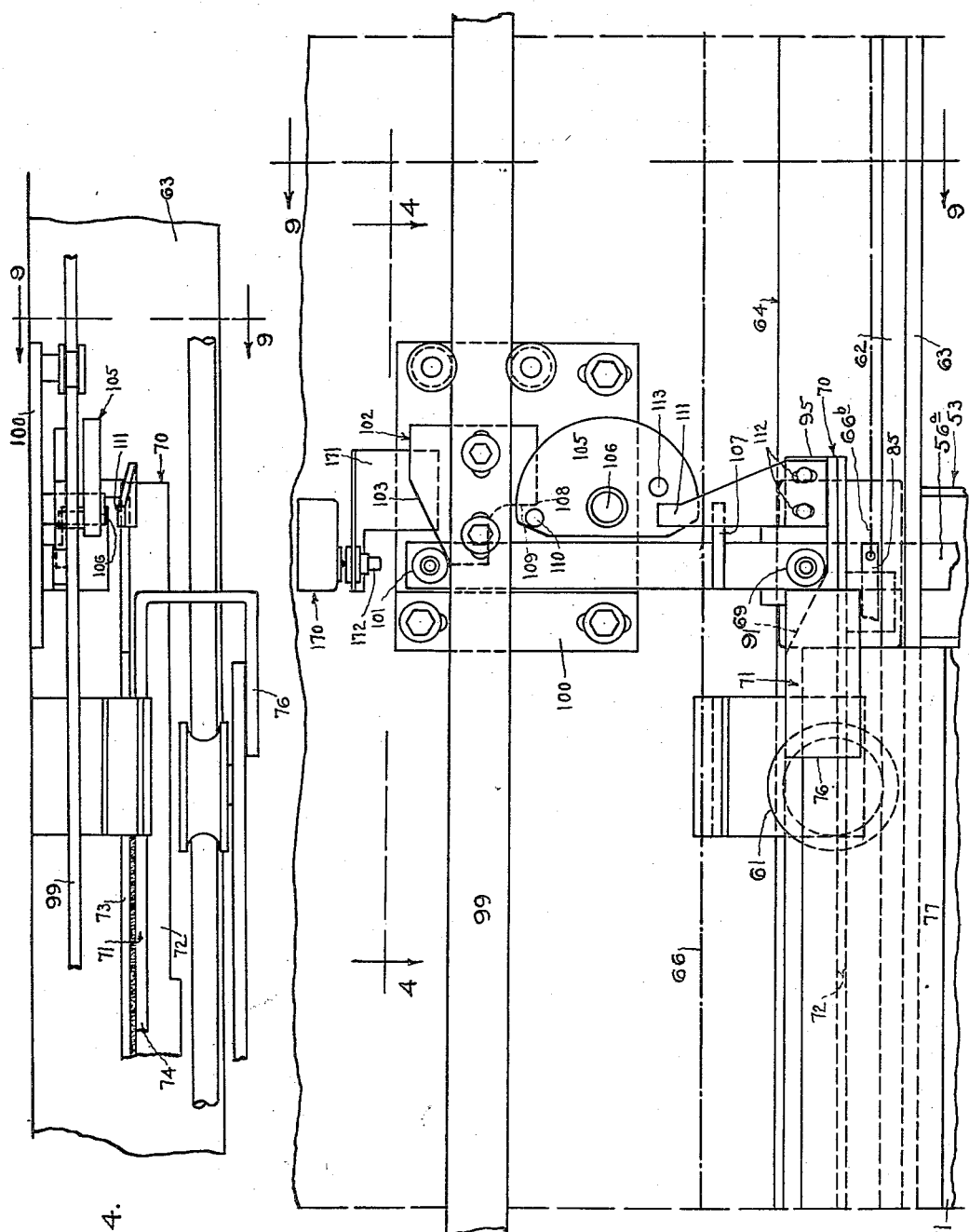

July 1, 1958 F. ADAM 2,841,252
JAIL LOCKING DEVICES, AND THE LIKE
Filed Oct. 15, 1953 11 Sheets-Sheet 4

Inventor:
Folger Adam

July 1, 1958 F. ADAM 2,841,252
JAIL LOCKING DEVICES, AND THE LIKE
Filed Oct. 15, 1953 11 Sheets-Sheet 5
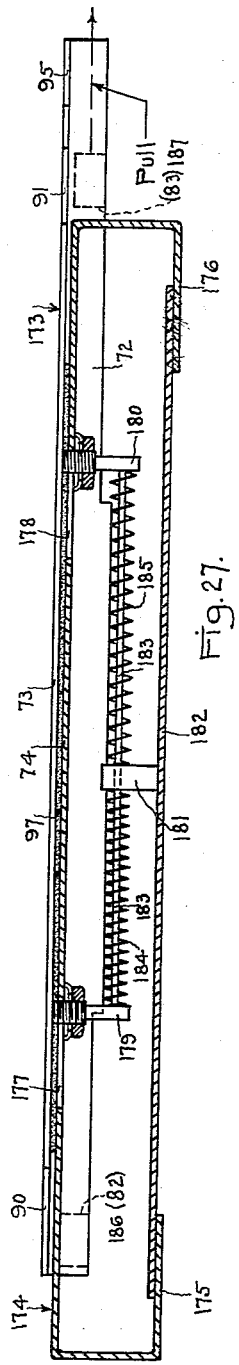
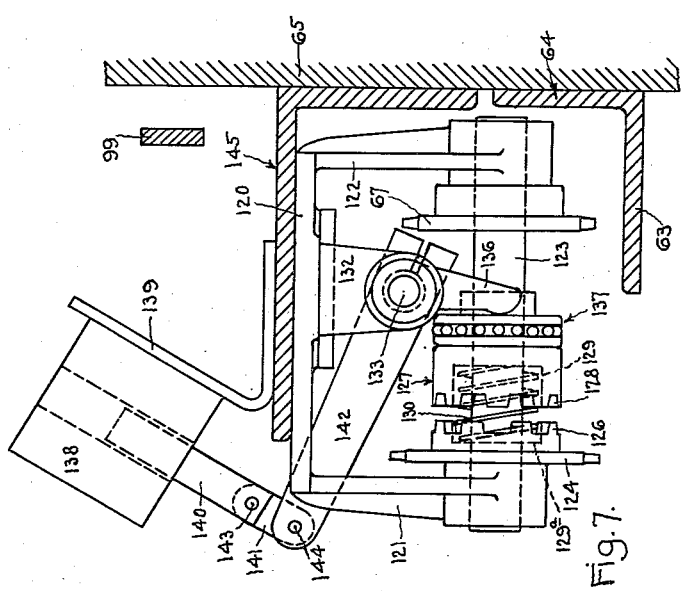
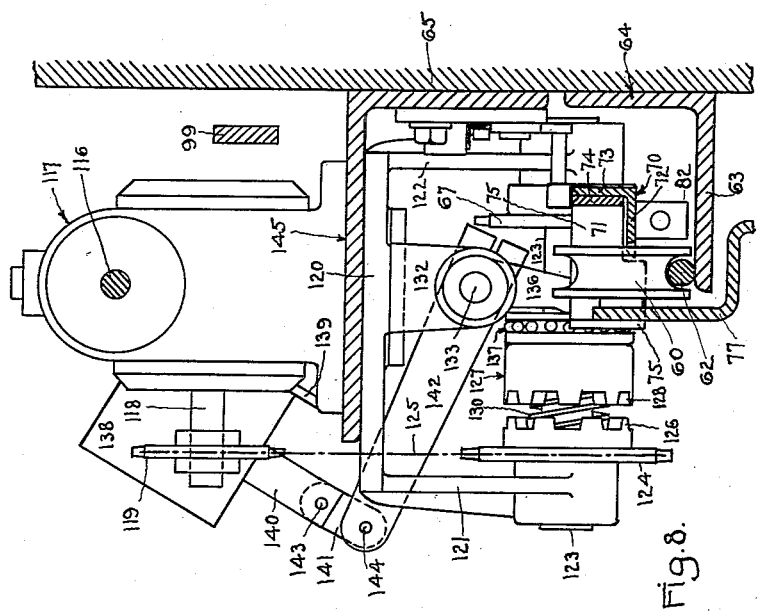
Inventor:
Folger Adam,

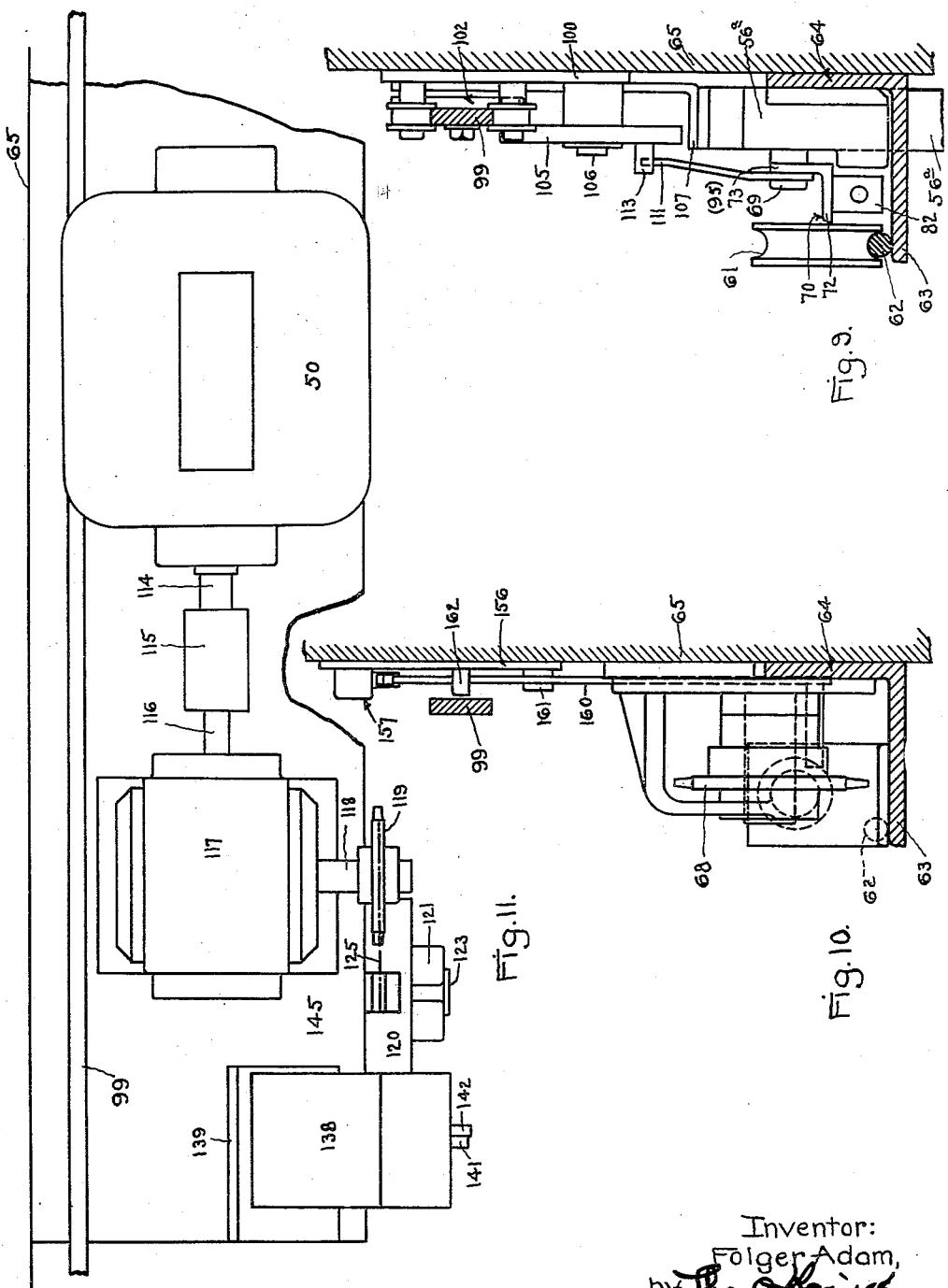

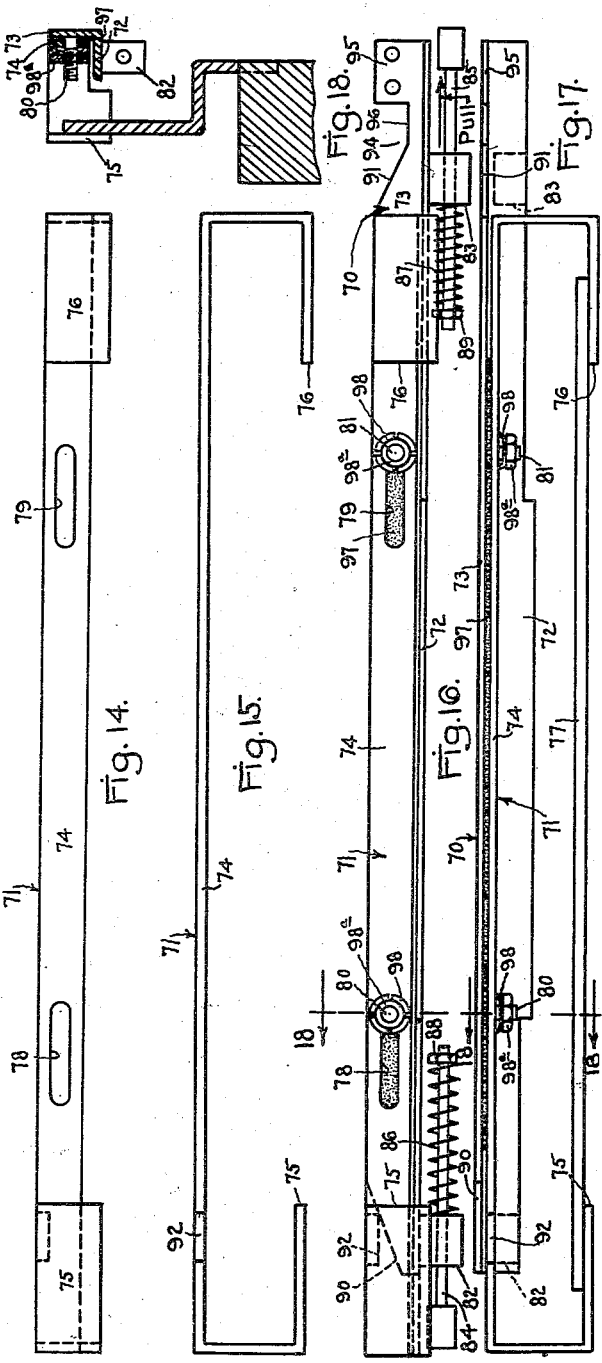

July 1, 1958 F. ADAM 2,841,252
JAIL LOCKING DEVICES, AND THE LIKE
Filed Oct. 15, 1953 11 Sheets-Sheet 8

Inventor:
Folger Adam,

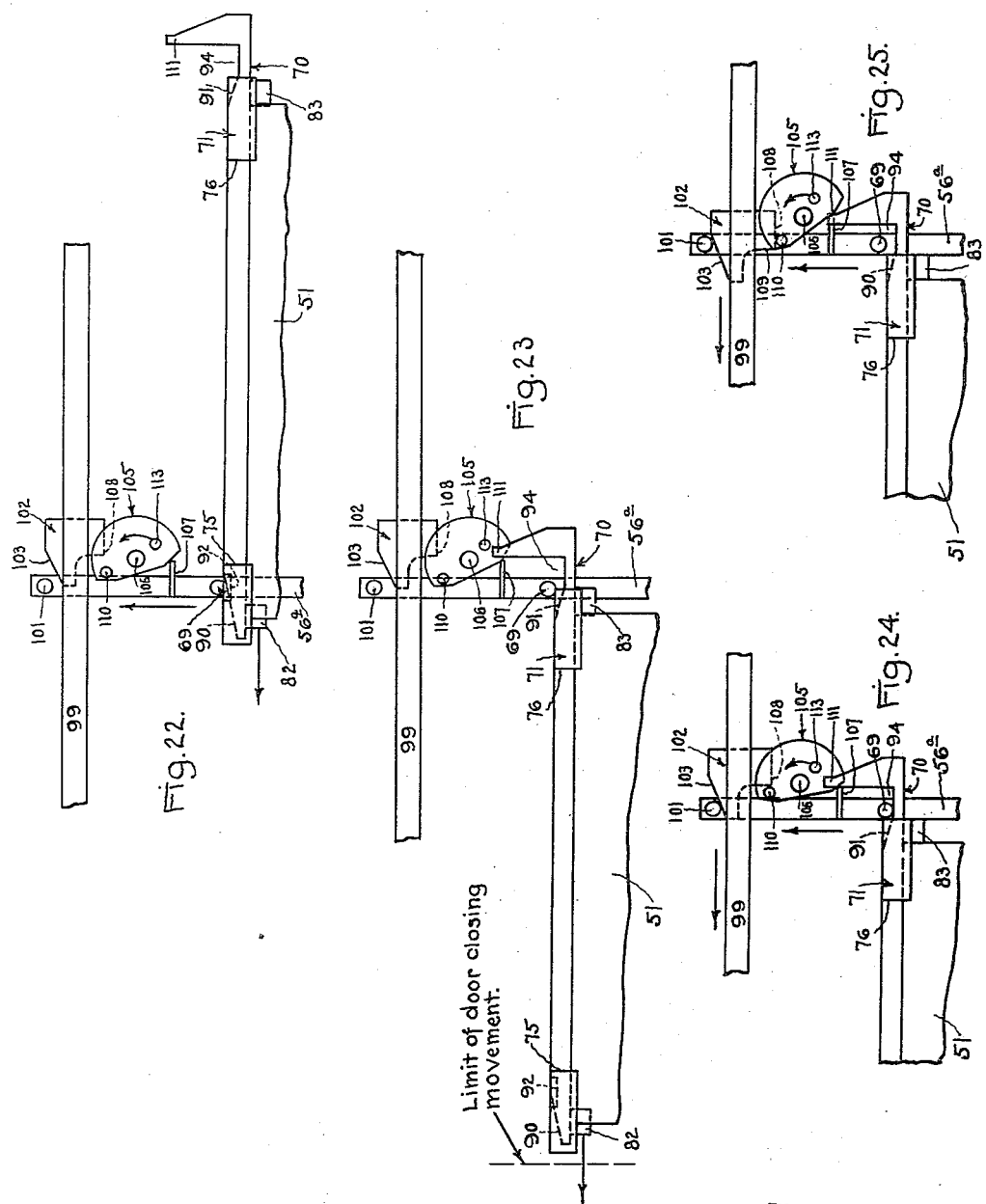

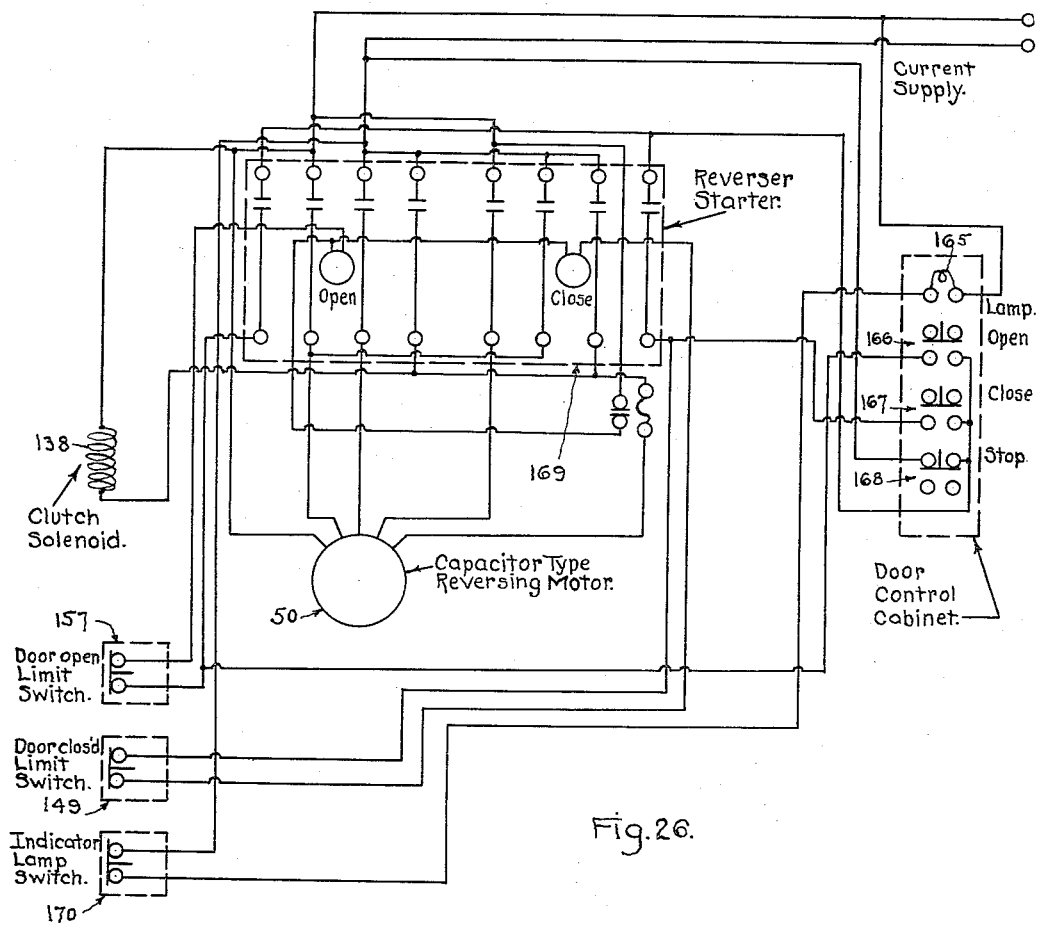

July 1, 1958 F. ADAM 2,841,252
JAIL LOCKING DEVICES, AND THE LIKE
Filed Oct. 15, 1953 11 Sheets-Sheet 11

Inventor:
Folger Adam,

United States Patent Office 2,841,252
Patented July 1, 1958

2,841,252

JAIL LOCKING DEVICES AND THE LIKE

Folger Adam, Joliet, Ill.

Application October 15, 1953, Serial No. 386,231

16 Claims. (Cl. 189—7)

This invention relates to improvements in jail locking devices, and the like. The present invention concerns itself primarily with improvements in jail locking devices which are provided with electrical means to cause the functioning of the cell doors into either the closed or open position, and for causing or enabling various controls of the doors to be effected, as will presently appear in detail. Included in these door controls are some, but not necessarily all, of the following conditions: Ability to dead-lock the door in its closed condition; ability to lock the door in its open position; ability to unlock the door prior to its opening movement; ability to unlock the door prior to its closing movement; ability to move the door from its closed position to its open position; ability to move the door from its open position to its closed position. The present improvements are such as to enable the performance of any or all of the foregoing operations by electrical means. Furthermore, the present improvements are such as to enable the performance of the necessary operations for either the door opening movement from the condition of the door being dead-locked to the door opened and locked condition, with the necessary operations which are incident to such a complete cycle effected automatically and in proper sequence; or for the door closing movement from the condition of the door being locked open to the door being dead-locked closed, with the necessary operations which are incident to such a complete cycle effected automatically and in proper sequence.

The prime purpose and object of the present invention is to provide the means by which the various above stated operations and functions may be performed electrically, and under simple electrical controls. Such electrical controls may be for individual cell doors, or for gangs of such doors, by use of a gang control bar serving all of the doors of such gang. The herein disclosed means is such as to be usable with either or both of such forms of controls.

It is a further important purpose and object of the present invention to provide means whereby the cell doors may be mechanically operated or mechanically controlled, thereby enabling the performance of the necessary operations under conditions when the electrical means is either non-operative, or when it may be desired, for special reasons to effect the needed operations by means other than electrical. One such special reason might be the failure of the electrical supply at the time the operations were to be effected.

Such mechanical means may comprise only the means to effect the door controls without provision for effecting the actual door movements by mechanical means; or such mechanical means may comprise both the means to effect the door controls and also mechanical means to effect the actual door movements. The disclosures hereinafter to be made are such as to enable the provision and use of either or both of such mechanical means with the electrical means which is normally used, as selected by the designer and builder of the equipment, or as specified by the purchaser thereof. The specific means hereinafter disclosed includes the mechanical control means above referred to, but it will be understood that provision may also be made for the mechanical operating of the doors or the mechanical door opening and closing movements, in addition to the electrical means to which the present invention broadly relates.

When mechanical means is provided for effecting the controls, additional to the electrical control (and operating means) hereinafter disclosed, such mechanical means is so constituted that the individual cells (usually comprising the cells of a gang) may be either dead-locked, or brought to a condition such that each individual cell may be locked or unlocked by a key applied and used at the location of such cell (sometimes hereinafter referred to as the "key-operation" position), or brought to a condition such that all of the cells are unlocked (sometimes hereinafter referred to as the "emergency gang release" position). The electrical means hereinafter disclosed is such that the foregoing mechanical provisions may be provided supplemental to the electrical means, and without material or any change in the said electrical means itself.

The electrical means hereinafter to be disclosed includes a driving motor by which the proper mechanisms are operated. Usually an individual motor is provided for each cell and such motor is caused to function according to the requirements of the operations to be performed at such cell. Such motor acts, among other things to move the door in either the opening or the closing direction, and must be of sufficient size and power to effect such movements, as well as to perform the other operations incident to the control functions. If a motor of such size as indicated just above should be permanently connected to the door itself through suitable connections it is evident that any door movement effected manually, as when the door might be unlocked by a key applied at the location of such door, it would in such case be necessary for the person opening or closing the door to exert a force sufficient to actually drive the motor and such connections of the motor to the door, as well as the force needed to move the door itself. Such a force would be very considerable, and in any case would constitute a serious deterrent to the incorporation of such electrical drive means in the system.

It is an important feature of my present invention to include in the connections between each door and the motor by which it is driven (generally individual to such door) a clutch which is normally open and in its non-clutching position, thus normally causing the motor to be disconnected from the door. Under these conditions the door may be readily moved in either the opening or the closing direction manually and without need of exerting excessive manual force. The arrangements are also such that each time an operation is to be effected electrically such clutch is energized, thus at once causing the necessary motor driving connection to be established to enable such electrical operation to be effected. Upon completion of such electrical operation the clutch is again de-energized and thus the motor is again disconnected from the door and other elements.

A simple means to effect the desired clutch operations as outlined in the preceding paragraph is disclosed herein. It includes the provision of an electrically operated clutch, and the terminals of such clutch are connected across or in parallel with the motor connections so that energization of the motor is accompanied by simultaneous energization of the clutch. Likewise, de-energization of the omtor is accompanied by de-energization of the clutch; and I have also provided spring means to normally move the clutch elements into their disengaged condition. Means responding generally to the requirements of this and the preceding paragraph are shown in my copending application, Serial No. 553,081, for Improvements in Jail Locking Devices, and the Like, filed December 14, 1955.

A widely used and conventional means to lock the cell door includes the provision of a vertically movable "locking bar" at the location of each cell door. Means are provided for locking the door, when in its closed position, by downward movement of such locking bar. Also, a conventional and widely used gang means comprises a horizontally movable "gang release bar" extending horizontally above each cell to be controlled thereby. Means are also provided for effecting vertical movements of the locking bar or bars by the horizontal movements of such gang release bar. Unlocking movements of the vertical locking bar or bars are effected by upward movements of such bars by use of a key or keys when permitted by the movement of the gang release bar to the proper position, here called "key-operation" position.

I have herein disclosed means to effect connections from the electrical motor to the upper portion of the cell door so that such door may be moved in either the opening or the closing direction by pull in the proper direction, effected by the power of the motor. The connections to the upper portion of the cell door include a lost motion device of such construction that movement of a door driving element may occur in the one direction or the other, under motor drive, prior to driving engagement of such element with the door itself. Upon completing such lost motion movement the door is engaged to effect the door driving movement. I have provided means to effect controls from such lost motion element to the vertical locking bar of the door so that the needed locking or unlocking movements of such vertical locking bar are effected prior to commencement of drive to the door itself, during the door opening operation, or during the door closing operation, as the case may be.

A further and important feature of the present invention is as follows:

I have also provided interlocking means between the vertical locking bar of each door and the horizontally movable gang release bar. Such interlocking means is so constituted that when the gang release bar is in its position corresponding to normal electrical operation the movement of the door to its closed position under electrical operation results in a final permitted downward movement of the vertical locking bar to the dead-locked position; and that the movement of the door to its opened position under electrical operation results in a final permitted downward movement of the vertical locking bar to a door locked open position. It is a feature and object of the invention to provide very simple and rugged means to effect the aforesaid interlocking functions, and a means which shall be very dependable and durable, and of simple construction and operation.

It is a further feature and object of the invention to so design and construct this interlocking device that movement of the gang release bar to the "key-locked" position results in movement of the interlocking device to a condition such that the vertical locking bar may then be locked or unlocked by a key applied at the position of such bar; and such that a further movement of the gang release bar to the "emergency gang release position" results in upward movement of the vertically movable locking bar to the unlocked position so that the door may then be manually or otherwise moved in either the opening or the closing direction.

When the door movement in either the opening or the closing direction is commeced by application of current to the motor and the clutch, such movement will continue to the desired terminus of such movement automatically. I have also provided means in the form of a limit switch for discontinuing the supply of current to both the motor and the clutch at completion of the door movement at either its fully closed or fully opened position. Thus there is assurance in the form of control by the position of the door itself, for ensuring delivery of current to the motor and the clutch only until the desired movement has been completed.

A further feature and object of the invention relates to the provision of constructions such that the motor drive element, the connections therefrom, and the clutch, constitute a unitary structure which may be applied to the permanent structuers of the cell block as such unit, after which the necessary connections to the door may be readily made. Likewise it is a further feature and object of the invention to provide a construction of door top structure including the previously referred to lost motion connection as a unitary structure.

Other objects and uses of the invention will appear from a detailed description of the same, which consists in the features of construction and combinations of parts hereinafter described and claimed.

In the drawings:

Figure 1 shows a front elevation of a single cell structure including the door thereof, and having applied thereto electrical devices embodying the features of the present invention, and showing the presence of the gang release bar and the connections and interlock between the same and the vertical locking bar for the door of the illustrated cell; the door being shown in its closed and dead-locked position;

Figure 2 shows a front elevation of substantially the left-hand one-third of the structure above the front of the cell, on enlarged scale as compared to Figure 1; and this figure shows the operating motor, the gear reducer, the clutch, and the bracket which journals the left-hand sprocket; and this figure also shows the left-hand portion of the lost-motion element, and the limit switch for discontinuing current supply to the motor and the clutch at completion of the door closing movement;

Figure 3 shows a front elevation of substantially the central one-third of the structure above the front of the cell, on enlarged scale as compared to Figure 1; and this figure shows the right-hand portion of the lost-motion element, the upper portion of the vertical locking bar, a portion of the gang release bar, and the interlock between the lost-motion element and the vertical locking bar, and the gang release bar;

Figure 4 shows a plan view corresponding to Figure 3;

Figure 7 shows a cross-section taken on the line 7—7 of Figure 2, looking in the direction of the arrows; being a broken section;

Figure 8 shows a cross-section taken on the line 8—8 of Figure 2, looking in the direction of the arrows; being a broken section;

Figure 9 shows a cross-section taken on the line 9—9 of Figure 3, looking in the direction of the arrows;

Figure 10 shows a cross-section taken on the line 10—10 of Figure 5, looking in the direction of the arrows;

Figure 11 shows a plan view corresponding to Figure 2;

Figure 12 shows a front elevation of the slide-bar of the lost-motion element, on reduced scale as compared to Figures 2 and 3;

Figure 13 shows a bottom view corresponding to Figure 12;

Figure 14 shows a front elevation of the U-bar of the lost-motion connection, being the bar which is connected to and which drives the upper portion of the door; and this figure is on reduced scale as compared to Figures 2 and 3;

Figure 15 shows a top or plan view corresponding to Figure 14;

Figure 16 shows a front elevation of the assembled slide-bar and U-bar, on the same scale as that of Figures 12, 13, 14 and 15; the slide-bar being drawn towards the right;

Figure 17 shows a top or plan view corresponding to Figure 16;

Figure 18 shows a cross-section taken on the line 18—18 of Figures 16 and 17, looking in the direction of the arrows;

Figure 19:
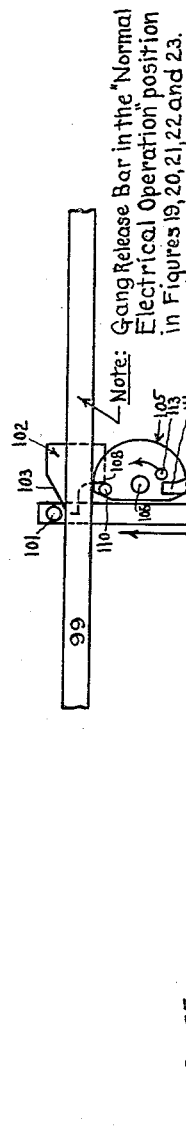
Figure 20:
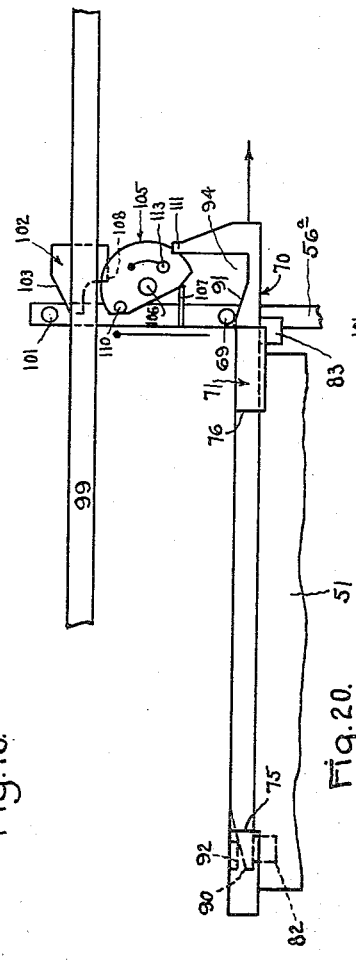
Figure 21:
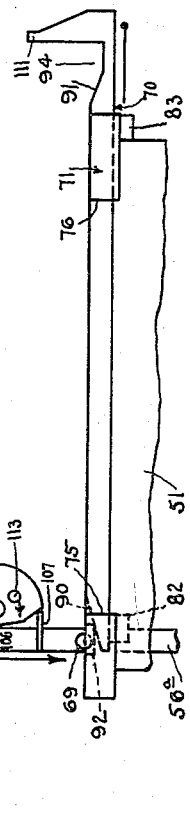

Figure 19 shows, more or less schematically, the lost-motion element, including the slide-bar and the U-bar, and also including the upper portion of the vertical locking bar, the gang release bar and the interlock between the gang release bar, the vertical locking bar, and the slide-bar; the parts in this figure being in the dead-lock position, the gang release bar being in its normal electrical operation position;

Figure 20 shows a view corresponding to Figure 19, but with the slide-bar drawn towards the right at commencement of the door opening movement under electrical drive; the door having been unlocked but not having yet commenced its movement towards the right;

Figure 21 shows a view corresponding to Figures 19 and 20, but with the door drawn fully to its full open position, and with the vertical locking bar lowered into engagement with the notch of the U-bar to thereby lock the door in its open position, but with suspension of the vertical locking bar at an elevation such that the interlock device is held in a position to permit the door to be again closed by the electrical drive means; in this position the left-hand end of the slide-bar may be moved leftward to cause its end cam surface to raise the vertical locking bar at commencement of the subsequent door closing movement;

Figure 22 shows a view corresponding to Figures 19, 20 and 21, but shows the parts just after commencing a door closing operation; in this view the vertical locking bar has been raised to the unlocking position by the leftward movement of the slide-bar, the door not yet having moved leftward;

Figure 23 shows a view corresponding to Figures 19, 20, 21 and 22, but with the door in its almost fully closed position but just prior to releasing the vertical locking bar to allow it to descend into the dead-locking position;

Figure 24 shows a view corresponding to Figures 19, 20, 21, 22 and 23, but with the gang release bar shifted leftwardly to the position for "key-operation" in which each cell of the gang is locked closed by the vertical locking bar of its mechanism, but in which position of the gang release bar the vertical locking bar of any selected cell or cells may be individually raised and unlocked to allow such selected cell door to be manually opened;

Figure 25 shows a view corresponding to Figures 19, 20, 21, 22, 23 and 24, but with the gang release bar shifted further leftward than its position of Figure 24, and into "emergency gang release" position in which the vertical locking bars of all cells have been raised by the gang release bar to unlock all cell doors, and permit manual opening or closing of any one or all of the doors;

Figure 26 shows, more or less schematically, a simple wiring diagram of electrical connections and elements for a single cell's mechanism, it being understood that the electrical controls for the electrical elements of a group of cells may be electrically brought into various gang control arrangements, largely at the discretion and judgment of the designer of the equipment, and to meet specifications relating to installation and operation of the equipment;

Figure 27 shows a plan view of a modified form of the "lost-motion" element.

Figure 28:
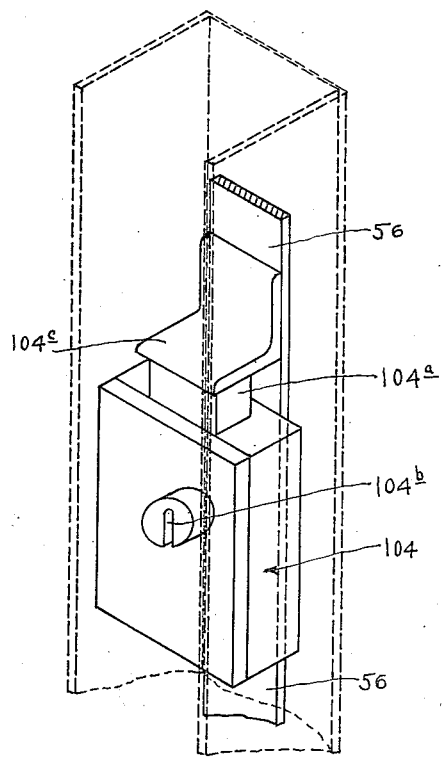
Figure 29:
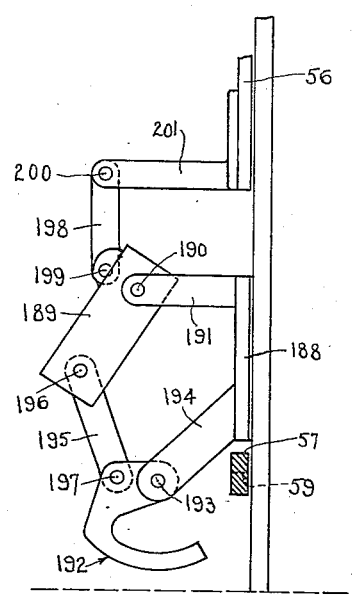

Figure 28 shows a fragmentary perspective view of one embodiment of vertically movable locking bar to be raised by a key operated lock at the location of a given cell door installation; and Figure 29 shows a fragmentary vertical section through a hook unit for locking engagement with the horizontal bar which is connected to the lower portion of a cell door, and the means to acuate such hook unit by operation of the vertically movable locking bar.

In the drawings I have shown the cell and its door equipment for a single cell, together with the adjacent portion of the gang release bar and the interlocking devices between the vertical locking bar for such cell door and such portion of the gang release bar. The electrical elements incident to the various operations to be performed at such cell including the driving equipment and the local control devices are also shown in these drawings, so that a completely operable and controllable equipment is illustrated for such single cell or other door. It will be understood that this equipment may therefore be installed and/or used individually for a single cell, and may then be controlled locally and/or remotely; and also that the illustrated equipment may be used for several or many cells of a gang or group or groups. In such case any suitable form of gang control, both electrically and mechanically, may be used in connection with the present equipment disclosures. I have not chosen to illustrate such gang electrical controls in the present application as they constitute the subject-matter of another invention or inventions.

At this point I wish to call attention, however, to the following condition affecting such gang electrical controls and operations:

As will be presently disclosed herein each cell door and its equipment is provided with its individual operating motor which is intermittently started and stopped from time to time according to the requirements of the operations to be performed. Frequently these motors must be of substantial size, as for example, of the order of ½ horse-power rating. Additionally, there is provided a clutch with each door and its equipment, such clutch being electrical in its operations, and requiring a substantial amount of current during its functioning. Also, provision is made such that the energization of the clutch electrically occurs during motor drive, and such that discontinuance of motor drive and electrical energization of the clutch occur at the same time. Accordingly, there is a substantial demand for current at the instant of bringing into operation the drive and control mechanism for each cell door, and such current demand may rise to as much as twenty or thirty amperes (on a 125 v. current supply) at the instant of starting. This current demand will then quickly fall to a much smaller value during the interval of door travel, and until such travel has been completed. Nevertheless, there is a substantial surge of current at the start of the operation. When several or many cell doors are brought together under a single gang electrical control it is evident that this surge at starting a gang operation may be very severe, especially when it is remembered that some gangs of cells include twenty-five to fifty cells, or more. Accordingly it is desirable to provide sequential or similar delivery of the current to the cells of a gang, so that the starting currents for the various cells will be demanded sequentially and not all at the same time. By such sequential starting of the various cell door operations the maximum demand for current may be held to a value only a fraction of that which would be required for simultaneous starting of all of the cell door operations. Even when the arrangement is such that the continued door movements after starting each door overlap, so that numerous cell doors are being simultaneously moved (each having been started by the sequential scheme of operations), the total demand for current is held to a relatively small value, since the "running" current demand for each motor is only a fraction of its starting surge of current.

With the foregoing brief explanation I now mention that the gang release bar arrangements herein disclosed, in their relation to the mechanisms for the individual cell door and its interlocking devices, are such as to lend themselves admirably to use in connection with such a sequential electrical control arrangement as just above outlined, and for this reason I have made the explanation above given concerning the possible use of the sequential electrical controls with the disclosures of the present application.

Referring to Figures 1 to 11, inclusive, I have provided for each cell door a driving motor 50, conveniently located above the door or in other position such that connections from such motor to the door may be made in good order and by short reaches. In Figures 1, 2 and 3, the cell door (or a portion of the upper section thereof) is shown at 51, the pilasters defining the door opening are shown at 52 and 53, and the grating enclosing the front of the cell enclosure is shown at 54 (to the right of the door opening), and at 55 (to the left of the door opening). Within the pilaster 53 there is located the vertically movable locking bar 56. This may be of any suitable construction, various of which are well known in this art. Conveniently also there is provided the horizontally extending bar 57 connected to the lower right-hand portion of the door, and movable back and forth with the door during its opening and closing movements. This bar 57 is enclosed in a housing so that it is inaccessible to the prisoner within the cell, and both the bar 57 and such enclosure reach rightwardly to the position of the lower end of the pilaster 53. This bar 57 is provided with the notches 58 and 59 adjacent to its end portions; and a suitable locking dog is provided which may be engaged with and disengaged from these notches, under control of the lower end of the vertical locking bar 56, the details of one embodiment of such connections are hereinafter illustrated and described. With the foregoing disclosures it will be evident that the locking and unlocking of the lower edge portion of the door are effected and controlled by the vertical movements of the vertical locking bar 56.

The door is carried by a suitable trackway in its movements. I have shown the door hanger wheels 60 and 61 which are connected to the upper portion of the door by suitable hangers. These wheels are grooved and they ride on the horizontal rail 62 carried by the horizontal flange 63 of the angle bar 64. This angle bar extends horizontally over the door opening and such portion of the right-hand portion of the cell enclosure 54 as is required to accommodate the needed amount of door travel between its extremes of movement. In various of the figures I have shown this angle bar as being carried by the vertical sheet 65 constituting a portion of the cell or other permanent structure.

The back and forth movements of the door are performed by suitable connections between the motor 50 and the upper portion of the door structure. Conveniently I have included in such connections a chain drive arrangement including the chain 66 which runs over the sprocket 67 above the left-hand portion of the cell structure, 55, and a wheel 68 (which may also be a sprocket), located above the right-hand portion of the cell structure 54. The end portions of this chain (which end portions are designated 66a and 66b for convenience) are connected to the door through suitable "lost-motion" elements presently to be described in detail. Thus the chain is in the form of a loop, the door elements between the two ends 66a and 66b providing the closing portion of such loop.

At this point I mention that the "lost-motion" elements just above referred to include a "slide-bar" and a "U-bar" which are relatively movable through a limited amount of movement with respect to each other, and which are compelled to travel together, once such lost-motion has been exhausted, in the door opening or the door closing direction to the limit of such door movement. One of these elements (specifically herein shown as the slide-bar) is the drive element, and the two chain ends 66a and 66b are connected to the ends of this slide-bar. The other lost-motion element (specifically herein shown as the U-bar) is the driven element, and is connected to the upper portion of the door 51. Under these arrangements, when chain pull is exerted on one end of the chain loop (for example, the end 66b) for a door opening movement, the slide-bar must move rightwardly with the chain pull until such lost-motion has been taken up (assuming that the slide bar was previously at its left-hand extreme of movement relatively to the U-bar), such lost-motion movement of the slide-bar being unaccompanied by any door movement. During this lost-motion movement of the slide-bar the necessary controls are effected on the locking bar (vertical) to unlock the door preparatory to actual door movement.

When the lost-motion has been exhausted the U-bar must follow the rightward further movement of the slide-bar, thus also moving the door in the opening direction. This condition will continue during the full door opening movement, the slide-bar remaining at its rightwardly limited movement with respect to the U-bar during this door opening travel. When the full door opening movement has been executed the vertical locking bar will be allowed to drop down at least part of its possible downward movement, and sufficiently to effect a locking engagement with the left-hand portion of the upper portion of the door, thus locking the door in its open position. It is here noted that when this operation occurs the slide-bar stands at its rightward limit of movement with respect to the U-bar. This condition will obtain until a door closing operation is to be performed; and I have provided friction means to ensure this condition, as will presently appear in detail.

Thereafter, when a door closing operation is to be executed the chain movement will be reversed by suitable drive from the motor 50 (specifically herein shown as being by motor reversal of rotation, but evidently other reversing means might be substituted if desired). Such reversal of chain movement will produce pull on the chain end 66a, thus producing a leftward pull on the slide-bar of the lost-motion elements. It being now remembered that the door was locked in its open position at conclusion of the previous door opening movement, it will be evident that at commencement of the leftward movement of the slide-bar the door will be prevented from immediately followed such leftward slide-bar movement, notwithstanding the frictional engagement between the slide-bar and the U-bar elements of the lost-motion element. Provision is made in the present disclosures for raising the vertical locking bar during this first leftward movement of the slide-bar, and while the U-bar and the door have not yet commenced leftward movement (closing), for an amount of raising movement sufficient to unlock the door and permit it to follow the continued leftward movement of the slide-bar. Such continued door movement leftward will be caused by the following of the U-bar in leftward direction, following the slide-bar, and may be due to the frictional engagement between these parts, but will generally be caused by the fact that the slide-bar has reached its extreme of leftward movement with respect to the slide-bar so that both of these lost-motion elements are now compelled to travel leftwardly together. This they will continue to do under the continued pull of the chain, until the door closed position has been attained. At that point the vertical locking bar will be allowed to drop and engage or cause engagement with the right-hand portion of the door, thus locking the door in its closed position.

It is here noted that when this door closing movement has been completed the slide-bar of the lost-motion unit will still be standing at its extreme leftward position of movement with respect to the U-bar, and such relative condition of these two elements of the lost-motion unit will continue due to the friction means between them, as already referred to, and which will be described hereinafter. Thus the slide-bar will be standing at its extreme leftward position with respect to the U-bar when the next door opening movement is to be executed.

Referring now to Figures 2 and 3, the upper portion of the vertical locking bar is shown at 56ª. This upper portion carries the forwardly extending stud 69 which may be provided with an anti-friction roller (not shown). Next referring to Figures 12 to 18, inclusive, I have therein shown the details of the lost-motion element, including the slide bar 70 and the U-bar 71. This slide-bar conveniently comprises a length of angle bar having its horizontal leg 72 extending forwardly from its vertical leg 73. The U-bar comprises a length of flat plate including the vertical body section 74 having its end portions extended forwardly and then turned inwardly towards each other to provide the brackets 75 and 76 to which the upper portion of the door is connected. It is here noted, however, that the door is not supported by these brackets (being supported by the rollers 60 and 61 already referred to), but said brackets serve as a means to transmit the opening and closing movements to the door. I have shown the plate 77 reaching up from the upper portion of the door, and formed to provide the Z-form shown in Figure 18, and with its upper corner portions connected to the brackets as already explained.

The U-bar is assembled to the angle bar slide-bar as shown in Figures 16, 17 and 18. In doing this the flat body portion of the U-bar is set against the front face of the vertical leg 73 of the slide-bar and with a slight clearance between the lower edge of the U-bar and the horizontal leg 72 of the slide-bar as shown in Figures 16 and 18. The U-bar is provided with the horizontally extending slotted openings 78 and 79 in the U-bar plate, together with the threaded studs 80 and 81 secured to the vertical leg 73 of the slide-bar and extended through said slotted openings. These openings are of length sufficient to allow for the needed amount of horizontal lost-motion movement between the slide-bar and the U-bar, and with limitation of such lost-motion at the proper limits of movement as will presently appear in further detail.

The blocks 82 and 83 are secured to the lower face of the horizontal leg 72 of the slide-bar (as by welding), and these blocks reach down far enough to align with the proximate end portions of the chain, 66ª and 66ᵇ so that the chain pulls are transmitted to the slide-bar through these blocks. As shown in Figure 12, each of these blocks is provided with the through opening aligning with the proximate chain end portion, and the studs 84 and 85 are extended through said block openings far enough to accommodate a spring, 86 or 87, as the case may be. The nuts 88 and 89 are then threaded onto the end portions of said studs to bring the springs under desired compression. However, when the desired adjustment has been effected the springs are still sufficiently open to allow for any needed compressing action of that spring at the pulling end of the slide-bar and corresponding expanding action of that spring at the following end of the slide-bar. Thus, when tension is exerted on one of the studs 84 or 85, as the case may be, said stud may be drawn through the corresponding block 82 or 83, as the case may be, with corresponding compression of the spring surrounding such stud, and at the same time the relaxing of tension on the other end of the chain will be compensated for by inward movement of the corresponding stud under urging of its spring. Thus the slack in the chain will always be taken up but with allowance for some movement of the chain in the tension direction prior to commencement of corresponding movement of the slide-bar. It is here noted that such spring yield arrangement provides against undue shock to the parts at commencement of motor operations and upon engagement of the clutch presently to be described.

The end portions of the slide-bar are provided with the slanting cam surfaces or edges, formed in the vertical flange such cam edges being shown at 90 and 91 for the left and right hand ends of the slide-bar, respectively. When the U-bar is assembled to the slide-bar the upper edges of the vertical leg 73 of the slide-bar and the body plate 74 of the U-bar substantially align with each other as shown in Figure 18. Furthermore, the U-bar is shorter than the slide-bar as shown in Figures 16 and 17 so that when the slide-bar is shifted in either direction with respect to the U-bar by the amount permitted by the slotted openings 78 and 79 the slanting surface 90 or 91 as the case may be, of the slide-bar is exposed beyond the U-bar's upper edge just referred to. In Figures 16 and 17 the slide-bar is shown in substantially its most rightward limited movement with respect to the U-bar, and with the slanting surface 91 correspondingly exposed to the right of the right-hand end of the U-bar.

It is here noted that the stud 69 of the vertical locking bar extends forwardly far enough to overlie the upper edges of the slide-bar and of the U-bar, and to be supported by that one of said edges (or both of them) which may at the time underlie such stud. Thus, for example, referring to Figure 16, if the door should be travelling rightwardly (the pull of the chain being exerted on the block 83 and thus causing the slide-bar to be extended rightwardly beyond the U-bar as shown in Figure 16) the stud would, for the time being, be supported by the upper edges of the slide-bar and of the U-bar in the raised position of the vertical locking bar, namely, the unlocked position. At the same time the slanting edge portion 90 at the left-hand end of the slide-bar is drawn far enough rightwardly so that the upper left-hand edge portion of the U-bar will support the locking bar stud 69 until completion of the rightward door opening movement. However, the parts are so proportioned that when such rightward door opening movement has been completed the U-bar has not moved far enough rightwardly to bring its extreme end to a position where the stud 69 may drop down past such extreme U-bar end; but I have provided the notch 92 in the upper edge of the U-bar near its left-hand end. Examination of Figures 16 and 17 will show that when the slide-bar is in its rightward extremely limited movement position with respect to the U-bar, the left-hand slanting surface 91 of the slide-bar underlies such notch 92. This notch 92 is of depth sufficient to accommodate the stud 69 of the locking bar to lock the door in the open position, but is not of depth sufficient to allow complete downward movement of the vertical locking bar its full possible movement. This notch is, of course of width to receive the stud 69. Thus, when the rightward door movement has been completed the stud 69 has descended into the notch 92 to lock the door open, but with the vertical locking bar sustained above its lowest normally moved position. The purpose of thus sustaining the vertical locking bar somewhat above its lowest position will become apparent hereinafter.

Upon exerting pull to the leftward by the chain end 66ª acting on the block 82, the slide-bar will first be drawn leftward as far as limited by the slotted openings 78 and 79, and against the friction between the slide-bar and the U-bar, thus leaving the door still in its fully opened position until this permitted lost-motion has been taken up. During this movement, however, the following relationships will exist:

Examination of Figure 16 will show that during the permitted leftward movement of the slide-bar, just referred to, the slanting surface 90 will act against the stud 69, thus raising such stud (and the vertical locking bar) until finally the stud has been cleared above the notch 92. The parts are so proportioned that such clearance of the stud from the notch will occur not later than the exhaustion of the amount of permitted lost-motion between the slide-bar and the U-bar so as to ensure that the stud 69 of the vertical locking bar will have been cleared from the notch by the time that the U-bar (and the door) must commence their leftward or closing movement. Thus the door is unlocked in time to permit the door closing movement to occur.

When the pull on the chain end 66ᵃ (for the door closing movement) has caused the slide-bar to shift leftwardly its permitted amount of shift with respect to the U-bar, against the friction between said parts of the lost-motion element, and during the door closing movement, the slide-bar and the U-bar have been occupying a position with respect to each other as illustrated in Figures 2 and 3 (instead of the relative positions of these two bars shown in Figures 16 and 17). Accordingly, during the final door closing movement and travel the right-hand end of the U-bar will be occupying the position shown in Figure 3, exposing the right-hand end of the U-bar for permitting drop of the stud 69 of the vertical locking bar into its locking position when the door has been fully closed. Examination of Figures 3, 12 and 16 shows that there is an extension 93 of the slide-bar at its right-hand end. This extension includes a deep notch 94 and the upwardly extending lug 95 to the right of such deep notch. The purpose of this lug will be explained presently. This notch 94 is so deep that its floor 96 permits full downward movement of the locking bar to its lowest required position for various functions, as will presently appear.

With the door and its slide-bar in the position shown in Figures 2 and 3 (being their positions at conclusion of the door closing movement and with the vertical locking bar in its lowered and locking position), chain pull exerted on the chain end 66ᵇ will cause the slide-bar to shift rightwardly against its frictional engagement with the U-bar, the door being in its locked closed position, since the stud 69 is in position to block rightward movement of the U-bar at commencement of such chain pull. Such rightward movement of the slide-bar will cause its slanting edge portion 91 to act against the stud 69, this raising the locking bar high enough to allow said stud to ride on the top edges of the slide-bar and the U-bar during the further rightward travel of the parts. This condition will obtain not later than the completion of the permitted movement of the slide-bar with respect to the U-bar, so that there is assurance that the stud 69 will be carried up to a point where said upper edges may ride beneath such stud. Thus the opening movement of the door under continued pull of the chain towards the right will be permitted without interference from the vertical locking bar. During this door opening movement the slide-bar and the U-bar will occupy the relative positions shown in Figures 16 and 17. That position of Figures 16 and 17 is the correct one for the relative positions of the slide-bar and the U-bar to permit downward movement of the stud 69 into the notch 92 of the U-bar at completion of the door opening movement, and to thus permit the door to be locked open as already explained.

It is noted that when the slide-bar of the lost-motion element has been shifted in one direction or the other with respect to the U-bar of said lost-motion element it must retain its thus shifted position with respect to said U-bar so that both the slide-bar and the U-bar shall retain their thus established relative positions or their relationship to each other. This is because the shifting of the slide-bar at commencement of its movement in either direction not only acts to bring about the necessary unlocking of the vertical lock bar to enable such direction of movement to be continued with the door itself, but also acts to set the parts into correct position for subsequent locking operation by the vertical locking bar at the terminus of such movement. This has been sufficiently explained hereinbefore. Accordingly I have made special provision to ensure that these two bars of the lost-motion element shall retain their relative positions against displacement from such positions except by the intentional operations of the chain pulls. Such provision is as follows:

Referring to Figure 18 which is a cross-section taken on the line 18—18 of Figures 16 and 17, looking in the directions of the arrows, there is shown a sheet of fiber or other suitable friction material 97 set between the proximate faces of the slide-bar vertical flange 73 and the U-bar vertical plate 74, so that relative movements between these parts are subject to the friction produced by this interlayer of friction material. Then, the washers 98 of spring type are set between the nuts 98ᵃ and the proximate face of the U-bar sheet 74 so that, by adjustment of these nuts the spring pressure exerted between the faces of the interlayer of friction material and the proximate faces of the slide-bar and of the U-bar may be adjusted to such amount as may be found best for good operation. Also, by this arrangement it is possible to effect adjustments of the amount of friction pressure exerted between the contacting surfaces from time to time to compensate for wear and for other reasons.

I shall presently describe the means which is illustrated herein for effecting controlled drive of the chain 66 in the one direction or the other, and for effecting discontinuance of such drive at each terminus, but before doing so I shall describe the gang release bar illustrated herein and the interconnections between said bar and the already described devices, and the interlocks which are disclosed between these several parts. It will be understood that such interlocks are provided between the electrically driven and controlled devices for each of the cell doors, and the gang release bar.

Referring to Figures 1, 3, 4 and 9 in particular, the gang release bar is shown at 99. It extends from the control cabinet or other control station along the gang or tier of cells which it controls, preferably above such cells as shown. The vertical locking bar of each cell (or the upper extension 56ᵃ of such locking bar) is carried up past this gang release bar so that interconnections may be made between these parts as needed. Conveniently, and as a matter of good design, I have provided a supporting plate for the gang release bar at the location of each such vertical locking bar, as shown at 100. Each such supporting plate is conveniently carried by and secured to the structure plate or sheet 65 already referred to. Such support preferably includes the local plate or sheet 100 which is slotted at the locations of the through bolts by which it is secured to the sheet 65 so that slight vertical adjustments of such plate 100 may be made during installation. Incidentally, it is also customary to provide for slight adjustments between each vertical locking bar 56 and its upper portion 56ᵃ so that exact and correct registry and operation of the parts will be secured at the time of or after installation. I have not herein shown such adjustment between the locking bar 56 and said extension 56ᵃ as such adjustments are well known in this art.

The upper portion of the vertical locking bar carries the stud 101 (preferably provided with an anti-friction roller), such roller being located above the upper edge of the gang release bar as shown in Figure 3 in particular. The gang release bar is then provided with a cam element 102 having the cam edge or surface 103 which may under-ride the stud 101 to thereby raise the vertical locking bar when the gang release bar is moved leftwardly in Figure 3. Preferably such cam element is connected to the gang release bar by bolts passing through the element 102, and conveniently said element is horizontally slotted as shown in Figure 3 so that slight horizontal adjustments of the said element with respect to the gang release bar may be effected to bring the operations of the vertical locking bar of each cell into correct synchronism with the intended operations. This cam element and surface 103 is of sufficient rise along its cam surface to ensure raising of the vertical locking bar to the door unlocked position by leftward shift of the gang release bar to its full extent. This is the "gang release position" previously referred to herein.

Each cell door locking mechanism may, if desired, be provided with a "key-operation" position in which a key may be used to effect cell door unlocking without either mechanical or electrical functioning of the vertical locking bar to its unlocked position. To this effect a key-operated device is provided in the pilaster 53 at a convenient height so that it may be readily operated by a key in the hands of an authorized person. I have shown such a device schematically at 104 in Figure 1, located on the pilaster 53. The arrangements are such, when this device is used, that the locking bar 56 may be actuated at the location of such device 104. Such key actuation will then cause raising of the locking bar the amount required to unlock the door, leaving the other doors of the gang locally locked. Such an arrangement is shown in Figure 28, by way of example, and is as follows:

The lock unit 104 includes a vertically movable bolt 104ᵃ which may be projected upwardly by a key inserted into the key opening 104ᵇ and then rotated. When such key operation has been completed the bolt will be locked in its raised position. It may afterwards be lowered or be allowed to lower by a reverse rotation of the key. To the face of the vertical locking bar 56, at a location above such locking unit 104, there is secured the flange 104ᶜ, such flange conveniently being one arm of a short section of angle bar the other arm of which is connected to the vertical locking bar. This flange is at a position on the locking bar such that when the lock bolt is fully lowered the locking bar may fully lower to its position of lock. The extent of bolt rising produced by the key operation is sufficient to cause full raising of the locking bar to its fully unlocking position. The locking bar can also be raised by means other than such key lock, thus raising the flange 104ᶜ away from the lock bolt 104ᵃ.

The third position of the gang release bar, that for "normal electrical operation" is the position of that gang release bar shown in Figures 1 and 3, and 19 to 25. I have made provision such that when the gang release bar is in said position of Figures 1 and 3 each of the vertical locking bars of the gang is positively mechanically locked against unauthorized raising of such bar. Nevertheless said arrangements are such that when the electrical means for any selected door is brought into operation the vertical locking bar of such cell is released from its previously locking condition, so that it can rise under the imposition of the raising force exerted by the slanting cam surface 90 or 91, as the case may be, of the slide-bar. The following elements and devices are provided to ensure this result:

To the plate 100 already referred to there is pivoted a circular interlock plate 105, pivoted at the point 106. To the upper portion of the vertical locking bar, at a location between the door mechanism and said plate 105 there is secured the laterally extending lug 107, best shown in Figure 3. The plate 105 is preferably so formed, as by cutting away its left-hand portion as shown, that it will normally return by gravity to the unoperated position shown in Figure 3. This normal position is determined and limited by the heel element or portion 108 extending down from the cam element 102 carried by the gang release bar, and which heel is provided with the leftward facing abutment 109 in position to be engaged by a stud 110 which extends from the back face of the plate 105 into the interfering position with such surface 109 as shown in Figure 3. At this point it is also noted that when the gang release bar is shifted leftward from its position shown in Figure 3 said surface 109 will press against said stud 110, rocking the plate counterclockwise from its position as shown in Figure 3. Normally said interfering plate stands in the position shown in Figure 3, the gang release bar being in its "normal electrical operation" position as shown; and in such position of the plate 105 its edge will stand in the way of the laterally projecting lug 107 of the vertical locking bar, preventing any upward movement of such locking bar sufficient in amount to effect any unlocking operations. Thus the vertical locking bar is normally locked against any upward unlocking movement when the gang bar stands in its "normal electrical operation" position.

Upon shifting the plate 105 by counterclockwise rock an amount to carry the interfering portion of its lower edge from interference with the upward movement of the lug 107 it is evident that the vertical locking bar may then be raised to effect unlock. I have already referred to such counterclockwise rock of the interfering plate by leftward movement of the gang release bar to a position other than that shown in Figure 3. Additionally, I have provided an upwardly extending finger 111 carried by the lug 95 at the right-hand end of the slide-bar, and to which lug I have previously made reference. This finger is conveniently secured to such lug by a bolted connection including the vertical slots 112 in the finger so that the exact elevation of the finger may be adjusted to secure correct synchronization of operation of the various parts. This finger stands to the left of a stud 113 carried by the interfering plate 105 when the parts are in the position shown in Figure 3, being the door closed and locked position after an electrical door closing operation. Under these conditions, when a door opening movement is commenced by chain pull to the right exerted on the slide-bar, said finger 111 will engage the stud 113, rocking the interfering plate 105 counterclockwise at the same time or slightly prior to the upward movement of the vertical locking bar caused by engagement of the slanting cam surface 91 with the stud 69. Such counterclockwise rock of the interfering plate 105 will be sufficient to carry the left-hand edge of the cutaway portion of the interfering plate into vertical alignment with the lug 107 of the locking bar, so that said lug may rise along such left-hand edge of the interfering plate as much as necessary to allow complete unlocking movement of the locking bar upwardly. Once such engagement of the lug 107 with such left-hand edge of the interfering plate has occurred the interfering plate may not return to its fully interfering position (as determined by the engagement of the stud 110 with the face 109 of the heel 108) until the locking bar has been allowed to descend substantially its fully amount into its fully locked position. It is also noted that said vertical locking bar may be allowed to descend partially from its fully raised position, without releasing the interfering plate 105 to return clockwise to its normal interfering position.

The foregoing relationship is directly related to the fact that the notch 92 of the vertical plate 74 of the U-bar (see Figures 14 and 15, and 16 and 17) is of limited depth so that the descent of the locking bar permitted at the time the stud 69 carried by that bar seats into such notch is limited to an amount under which the lug 107 carried by the locking bar will still be in interfering position with respect to the plate 105, preventing that plate from complete return to its gravity final position. Now the entry of the said stud 69 into the said notch 92 occurs coincidentally with completion of the door opening movement, and it has also been explained that such entry of the stud into the notch serves to lock the door in its open position until the locking bar is again raised. Since this notch has its floor sufficiently high to retain the locking bar in a raised position, sufficient to cause interference of the lug 107 of the locking bar with the left-hand edge of the interlocking plate 105, it follows that said interlocking plate will be retained in its partially counterclockwise rocked position, where it will not prevent further upward movement of the vertical locking bar needed to effect complete unlocking movement. Such further upward movement to the completely unlocked condition must occur coincident with the commencement of the door closing movement and is produced by the engagement of the left-hand slanting cam surface 90 of the slide-plate with the lug 69 of the locking bar, as previously explained herein.

It is also noted that during the door opening movement the finger 111 carried by the right-hand extension of the slide-plate can pass beneath the stud 113 which is carried by the interlocking plate since said interlocking plate may rock sufficiently counterclockwise to allow such rightward movement of the finger 111 as far as necessary to ensure complete door opening movement. The corresponding raising of the vertical locking bar will carry the lug 107 high enough to retain the interlocking plate in such counterclockwise rocked position, so that thereafter, during the final stages of the door closing movement the finger 111 may pass beneath said stud 113, after which the door closing movement will be completed with corresponding drop of the stud 69 into the position shown in Figures 3 and 19. Simultaneously with such dropping of the locking bar to its fully lowered position the lug 107 will move down far enough to allow the interlocking plate 105 to rock back into its gravity restored position, as shown in Figure 3.

Reference may be had to Figures 19 to 25, inclusive, which show, schematically various of the operating parts to which I have made reference in the foregoing operational explanations. These figures show the parts in their relative positions corresponding to various sets of conditions, and serve to facilitate an understanding of the operations. In view of the rather extended description of the operations already given it is not deemed necessary to describe these figures in detail, since the operating parts are also identified by their respective identifying numbers in said figures.

Evidently any suitable means may be provided for causing the chain (or other tension element which might be substituted therefore) to execute its back and forth movements to cause the various operations to be effected. Such means might, if desired, be a manual drive to the chain executed through proper gear connections thereto, and, if need be, through a suitable gear reducer. As already explained, however, I have provided electric power means, individual to each cell and its operating and controlling devices, for actually producing the necessary operations. This I shall now describe in further detail, as follows:

The motor 50 is either a D. C. or an A. C. motor, to meet the requirements of the current supply. The illustrated motor is an A. C. motor of the capacitor type, for operation in either direction of rotation. I am not here concerned with the details of such motor element as any suitable motor may be used. The motor shaft 114 connects, through a suitable coupling 115, to the input shaft 116 of a gear reducer element 117. The output shaft 118 of this gear reducer element carries a wheel or sprocket 119. A clutch element is introduced between said output shaft 118 with its wheel or sprocket 119, and the sprocket 67 by which the chain is driven. Any suitable form of clutch element may be here used which may be certainly controlled and operated to connect the drive to and disconnect the drive to and from the sprocket 67. In Figures 2 and 7 I have shown a satisfactory form of such clutch and related arrangements, as follows:

A bracket 120 is connected to a suitable frame member and is provided with the downwardly reaching arms 121 and 122 at its front and back, respectively. A shaft 123 is journalled in these arms. The sprocket or wheel 124 is loosely journalled on this shaft, and a drive connection is established from the element 119 of the gear reducer 117 to such element 124; and preferably both of the elements 119 and 124 are sprockets so that such driving connection, 125, is then in the form of a chain drive.

The sprocket 67 is drivingly mounted on the shaft 123. The sprocket 124 is provided with clutch teeth 126 at its back face. A companion clutch element 127 is slidably mounted on the shaft 123, and is splined to said shaft, so that said shaft is compelled to rotate with the clutch element 127 and be driven thereby. This clutch element is provided with the teeth 128 which may be engaged with or disengaged from the teeth 126 of the sprocket 124 according to the position of said element 123 along the shaft. This element 127 is provided with the recess 129 in its front face, and the sprocket wheel 124 is provided with a companion recess 129ª, which recesses 129 and 129ª accommodate a compression spring 130, such spring urging the element 127 rightwardly (in Figure 7) and into the non-clutching position.

The bracket 120 also carries the downwardly extending arms 131 and 132 (see Figures 2 and 3), and a shaft 133 is journalled in these arms, such shaft lying above the shaft 123 already referred to. A bifurcated element 134 is mounted on and drivingly secured to this shaft 133. Said element 134 has the two downwardly extending arms 135 and 136 which lie at opposite sides of the shaft 123, and between the clutch element 127 and the sprocket or wheel element 124. A ball or other suitable, preferably anti-friction, thrust bearing 137 is interposed between the lower ends of the arms 135 and 136, and the clutch element 127. Accordingly, counterclockwise rock of the shaft 133 produced by expansion of the spring 130 will permit unclutching action to occur, whereas clockwise rock of said shaft 133 will produce clutching action to occur against the force of the spring. It is noted, however, that the normal condition of the clutch is its unclutched condition, in which its element 127 has been shifted rightwardly under spring urge, and that the clutched condition will only continue as long as the shaft 133 is forcibly held in its clockwise rocked position. Suitable means are provided for rocking the shaft 133 in its clockwise direction of rock to effect the clutching action, but I first call attention to the following conditions:

Good design and engineering practice will generally require the provision of the gear reducer, such as that shown at 117, between the motor and the chain sprocket 67. The gear reducer 117 shown in the drawings includes a worm or spiral gear reduction stage, the shafts 116 and 118 being at right angles to each other. When the pitch of the engaging threads of such stage of the gear reducer are such that said reducer is "irreversible"— that is, are such that the shaft 116 cannot be driven by force applied from the shaft 118—it is evident that it would be impossible to ever rotate the sprocket 67 in either direction by a manual operation exerted on the door. In other words, under such stated conditions, imposed by the gear reducer itself, and in the absence of a suitable clutch interposed between the door and the gear reducer, the door could only be operated by drive coming from the shaft 116, that is, by the motor drive. Even if a gear reducer should be used which did not include such irreversible stage of gearing it is clear that, in the absence of a suitable clutch interposed in the device at a suitable point, a large force would have to be applied to the door directly, to move it in either direction, since the entire line of drive, including the gearing and the motor itself would have to be thus manually driven. Accordingly the provision of the clutch between the gear reducer and the sprocket 67, by which the final drive to the door is effected is very important from a practical standpoint.

I have provided electrical means to shift the clutch element 127 to the clutching position, as follows:

The solenoid 138 is carried by the bracket 139 which is in turn mounted on a suitable supporting element of the structure. The armature 140 of this solenoid is connected by a link 141 to an arm 142 which is secured to the rock shaft 133, said link being pivotally connected to the armature and to the arm by the pins 143 and 144, respectively. The parts are so proportioned that when the clutch element 127 stands in the unclutched position shown in Figure 7 the armature is in its lowered position, as illustrated in said figure. Upon energizing the solenoid, the armature is drawn into the solenoid and upwardly, thus rocking the shaft 133 and shifting the clutch element 127 leftwardly in Figure 7 and in the clutching direction, and against the urge of the spring 130.

As stated, any suitable form of clutch may be used but the illustrated clutch includes the companion sets of teeth 126 and 128 on the two clutch elements. Upon energizing the solenoid for the clutch engaging operation the element 127 is quickly shifted leftwardly. If, at the instant of contact of the teeth 128 of such shifting element 127 its teeth are in correct registry with the teeth 126 driving engagement will be produced, and the drive to the sprocket 67 will be made. If, however, such registry does not, at the instant of contact, exist, the teeth 128 will, for a short time directly contact the right-hand faces of the teeth 126, without effecting drive, but even in such case a short rotation of the clutch element 127 will bring about the desired tooth registry, allowing the element 127 to be fully shifted leftwardly to effect complete clutching action.

It is here noted that I have provided for energization of the solenoid 138 synchronously with energization of the motor, as will presently appear. Accordingly, by the time the clutch element 127 has been shifted leftwardly to engage the element to its left the motor will have commenced rotation, and thus the clutch element 127 will also be rotating when the leftward shift has been completed. Thus the clutch teeth will be brought to registering relation to allow full clutching to occur.

Upon de-energization of the solenoid the spring 130 will urge the clutch element 127 rightwardly to its non-clutching position. Since, prior to such de-enerigization of the solenoid the clutch has been effecting power drive to either open or close the door, it is evident that the faces of the clutch teeth have been in forcible engagement with each other. Any tendency of the teeth 128 of the element 127 to "hang" on to the teeth 126 will be substantially eliminated by forming the teeth of both elements with a relief of a few degrees, as shown in Figure 7, the relief there shown being about ten degrees.

Conveniently the motor 50, the gear reducer 117, and the solenoid element 138 and the clutch unit are all mounted on and supported by an angle bar member 145. This is, in turn mounted on the structure plate 65 to which reference has been previously made. Thus the power drive devices are all brought into a convenient unit or assembly which can be attached as an assembly to the structural elements of the jail installation.

Located near the door closed position there is a limit switch unit 146. This unit includes the plate 147 which may be attached to a suitable structure element, such as the downwardly extending flange 148 of the angle bar member 145 already referred to. This plate 147 carries the switch 149, illustrated as a microswitch of conventional and widely used construction at the present time. Such microswitch is provided with a leaf spring material contact which is normally biased to move or spring to a normal position. A small and light leaf 150 is carried by this microswitch and, when depressed towards the body of the switch serves to reverse such biased leaf element. A small roller 151 is carried by the free end of this leaf 150 in position to be engaged by a rock arm 152 pivoted to the plate 147 at the point 153. The free end of this arm 152 carries the stud 154 in position to be engaged by the slide-bar or other convenient element of the door carried devices, so that, at the proper time and at conclusion of the door closing movement said roller will be engaged and rocked slightly upwardly, thus also rocking the arm 152 and through it the leaf 150 to reverse the microswitch. Conveniently the plate 146 is provided with the horizontal slotted openings 155 through which the bolts or screws by which such plate is connected to the angle bar flange 148 pass, and by this means the plate 147, together with the microswitch and the operating elements may be brought to exact position for current control to stop the power drive at the correct time in the door closing operation.

Figures 5, 6:
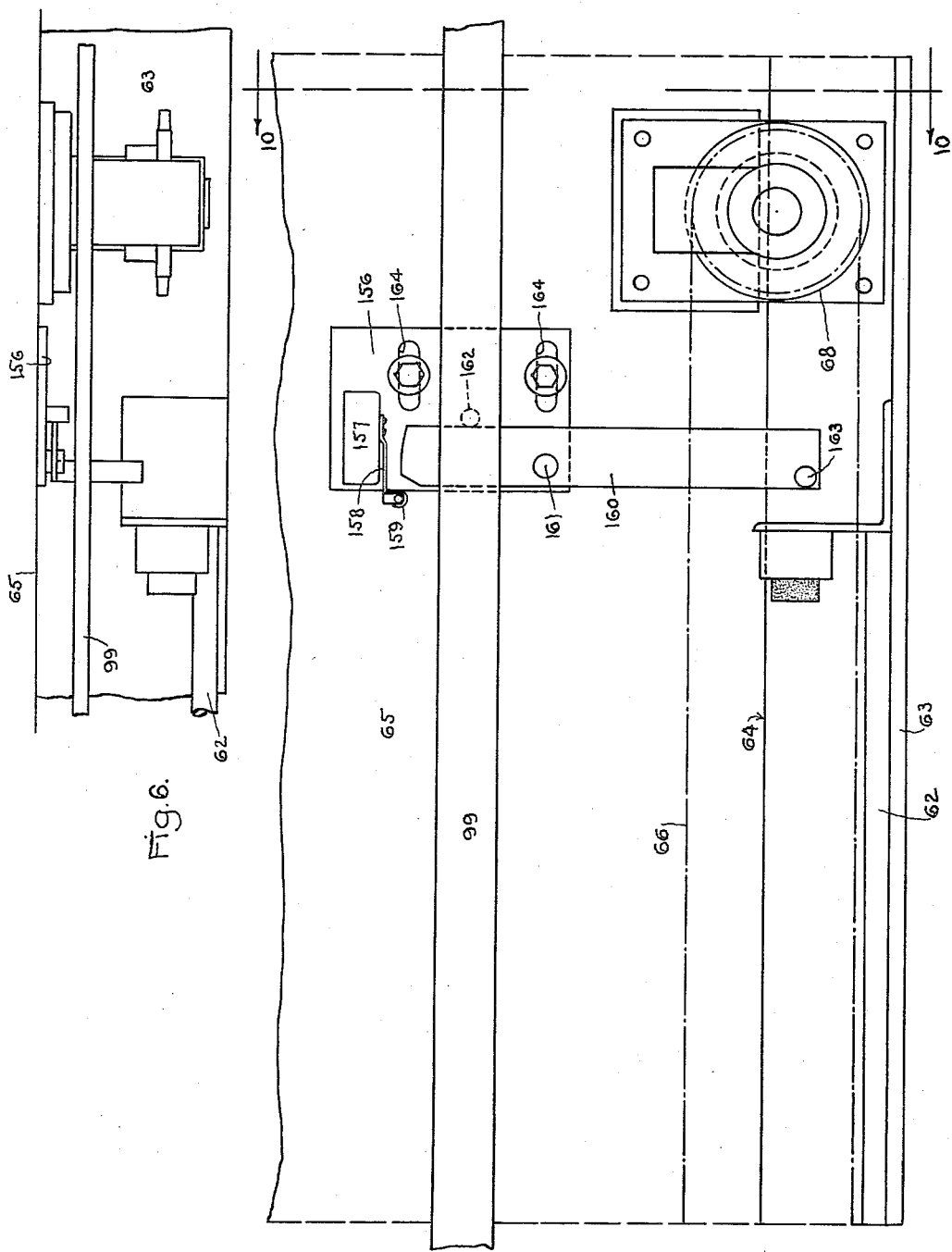
Figure 5 shows a front elevation of substantially the right-hand one-third of the structure above the front of the cell, on enlarged scale as compared to Figure 1; and this figure shows the bracket for the right-hand sprocket, and the right-hand limit switch.
Figure 6 shows a plan view corresponding to Figure 5.

Referring to Figure 5 there is there shown the plate 156 secured to a convenient structure element, such as the plate 65. The microswitch 157 is carried by this plate, its light leaf 158 and roller 159 being in position for engagement by the upper end of a rock arm 160 which is also pivoted to the plate 156 at the point 161. A stud 162 carried by the plate 156 limits the swing of such arm clockwise, but permits it to swing counterclockwise when needed. A stud 163 is carried by the lower portion of this arm in position for engagement by the rightward projection of the slide-bar at conclusion of the door opening movement, thus rocking the arm counterclockwise at conclusion of the door opening movement. The upper end of this arm is slightly cammed and is so related to the roller of the microswitch leaf 158 that the microswitch will be reversed at the conclusion of the door opening movement, with corresponding reversal of its contacts. Conveniently the plate 156 is provided with the slotted openings 164 through which are passed the bolts or screws by which that plate is secured to the plate 65, thus enabling exact adjustment of the plate 156, and related elements, so that the microswitch will be functioned at the proper instant and location of the door.

Referring to Figure 26 I have therein shown a simple wiring diagram, more or less schematically, for electrical control of a single cell equipment such as hereinbefore disclosed. In this case I have shown the various electrical elements already referred to, as well as a signal lamp or the like to indicate the position of the vertical locking bar, together with suitable switches for effecting manual control of the motor for either door opening movement, door closing movement, or for stopping the motor operation at any time, as in case of an emergency, prior to normal limit switch stopping control.

I shall not describe this wiring diagram in detail, but call attention to the following illustrated elements; the indicating lamp 165 which is used to show by its condition of illumination or otherwise the closed or locked position of the vertical locking bar, and the button switches 166, 167 and 168 which, when operated serve to start the door opening movement, the door closing movement, or the emergency stopping respectively. In this diagram other elements such as the limit switches, are shown by numerals corresponding to previous identifications of such elements. I may here mention that the motor 50, identified in this wiring diagram, is of a capacitor type, reversing motor of fractional horse-power rating, and equipped with a reversing switch. I may also state that I have, in this wiring diagram, shown various of the switch controls as included within a unit starter box, 169. This illustration is here given merely by way of example, and not with any intention to limit either the scope of the invention or the interpretation of the claims, except as such limitations may be incorporated into the claims themselves.

Conveniently a limit or signal switch may be provided for indicating the positions of the vertical locking bar, that is, whether it is in the dead-locked position with the bar fully lowered, or in a partially lowered bar position, or in the fully raised position, to which positions I have referred. I have shown such switch at 170 in Figures 1 and 3 in the form of a microswitch. It is supported above the bracket 171 secured to the plate 100. This bracket carries a light and vertically movable pin 172 which is in position to be engaged by the upper end of the locking bar 56 (or its upper extension 56ᵃ) when the locking bar reaches its unlocked position, thus reversing such switch and giving a corresponding signal. Such switch is also shown in the wiring diagram of Figure 26.

In Figure 27 I have shown a plan view of a modified form of "lost-motion element" which may, if desired, be used in place of the form of such element heretofore described in detail. The principal difference between this modified form of lost-motion element and that previously described resides in the arrangement of the springs which are included in the device. In this connection it is noted that in the previously described arrangement there is a compression spring interposed directly between each end of the chain loop and the proximate end of the slide bar, so that movement of such slide-bar will not commence until a sufficient differential of forces has been developed in the springs to overcome the frictional engagement between the slide-bar and the U-bar of the lost-motion element. In the arrangement shown in Figure 27 I have made provision whereby the chain ends are connected directly to the end portions of the slide-bar, and have then interposed spring means between the slide-bar and the U-bar so that the spring differential is developed between said parts.

In Figure 27, the slide-bar is designated 173, and the U-bar is designated 174. This slide-bar is shown as being of angle bar construction, and the U-bar as being in the form of a flat sheet formed to provide the end brackets 175 and 176 as in the previous construction. The ends of the slide-bar are also formed with the slanting cam surfaces as before, and the U-bar is set above the horizontal leg of the angle of the slide-bar as before. In the present case the plate of the U-bar is provided with the horizontally extending slots 177 and 178, and the forwardly extending studs 179 and 180 are secured to the vertical leg of the slide-bar angle and project through said slots. These studs and slots are properly proportioned and related to each other to allow for the required amount of movement of the slide-bar relatively to the U-bar to ensure the functioning previously explained, and without limitation of such relative movement prior to effecting such desired functions.

The stud 181 is secured to the central portion of the plate 182 which extends between the two brackets 175 and 176, which plate may be the same as the plate 77 shown in Figure 17 or a special plate additional thereto. A rod 183 is conveniently extended between the studs 179 and 180, and through an ample opening of the stud 181; and the compression springs 184 and 185 are set onto this rod and extended between the stud 181 and the stud 179, and between the stud 181 and the stud 180, respectively. These springs should be given a preload of amount sufficient to ensure good operation and to hold the two elements of the lost-motion element under good control. Still, these springs must be of sufficient openness when thus pre-loaded, to ensure ability of the slide-bar and the U-bar to execute the necessary relative movements which have been explained in detail hereinbefore.

With this arrangement the chain ends are connected directly to the proximate ends of the slide-bar, the blocks 186 and 187 being secured to the bottom face of the horizontal leg of the slide-bar angle, as by welding, as explained in connection with the previously described lost-motion element. However, it is noted that in the present case these connections of the chain ends to these lugs do not include any yieldable element but are direct connections.

With this modified construction of the lost-motion element it is seen that movement of the chain in either direction must be accompanied by immediate and corresponding movement of the slide-bar, thus ensuring very close control of the slide-bar's movements during the early stages of the operation. These early stages of the operation are the ones during which the slanting cam surfaces 90 and 91 of the slide-bar are performing their functions of raising the vertical locking bar. Nevertheless, the provision of the lost-motion between the slide-bar and the U-bar ensures proper functioning according to the principles hereinbefore fully explained.

As illustrative of jail locking device constructions embodying means to ensure locking of the vertical locking bars at both top and bottom of the door, reference may be made to Letters Patent of the United States, No. 2,288,666, issued July 7, 1942 to me. As illustrative of jail locking device constructions embodying key locking devices reference may be made to Letters Patent of the United States, No. 2,148,521, issued February 28, 1939, to me. These patents are here referred to only by way of illustration and not as any limitation of the usefulness or applicability of the novel features of invention herein disclosed. I have already described another form of key operated lock for manually raising the vertical locking bar when it is released. Such description referred to Figure 28. I now refer to Figure 29 as showing a form of locking hook and related parts for engaging either of the notches 58 or 59 of the bar 57 when the locking bar 56 is lowered and for effecting disengagement of said locking hook from such notch when the locking bar is raised.

A plate 188 is secured to the cell structure near the lower end of the cell door opening. A gravity plate 189 is pivoted at 190 to the bracket 191 of this plate at a point such that the center of gravity of the plate and the down force exerted by the locking bar when lowered tend to rock said gravity plate well over to the right from its position shown in Figure 29. The hook 192 is pivotally connected at 193 to the bracket 194 of the plate 188. A link 195 is pivotally connected to the plate 189 and to the hook 192 at the points 196 and 197, respectively. A link 198 is connected to the plate 189 by the pivot 199 and is connected by the pivot 200 to the bracket 201 connected to the lower end of the vertical locking bar. Upon lowering the locking bar the hook may engage that notch 58 or 59 of the bar 57 which is in register with such hook according to the open or closed position of the cell door, as the case may be.

Where, in the present specification I have used the term "cell" or "cell door" such term has been used, not by way of limitation, but rather as illustrative of embodiments or uses of various of the features herein disclosed.

I claim:

1. In a jail door locking mechanism, the combination of a longitudinally movable jail door and means to support said door during the longitudinal movements of the door along a horizontal path of travel of substantially uniform elevation between door closed and door open terminal positions, a vertically movable locking bar adjacent to the path of door travel, door movement interfering means on the locking bar, two door movement interfering means connected to the door, one being a door locked closed means and the other being a door locked open means, said two door movement interfering means being horizontally separated from each other in the direction of door movement an amount equal to the full travel of the door between its door closed and door open terminal positions, means to guide the locking bar for vertical movements without vertical movement of the door, said locking bar guiding means being constituted to permit locking bar movement in a locking bar path of travel adjacent to the path of travel of the door and to retain the locking bar against displacement horizontally in either direction of door movement, locking bar movement in one direction being a locking movement and locking bar movement in the other direction being an unlocking movement, the locking bar interfering means being engageable with the door locked closed interfering means on the door when the door is in the closed terminal position or with the door locked open interfering means on the door when the door is in the open terminal position selectively according to the position of the door when the locking bar moves in the locking direction, together with a lost-motion device including a driven element connected to the door and elongated in the direction of door movement and a driving element parallel to the driven element and movable with respect to the driven element in either direction of door movement, and means to limit the movement of the driving element in each direction of door movement with respect to the driven element, between a door closing driving element position with respect to the driven element and a door opening driving element position with respect to the driven element, means to drive the driving element in either direction of travel, the driving and driven elements of the lost-motion device including companion parallel horizontal locking bar interfering means supporting tracks extending in the direction of door movement, the supporting track of the driving element including an upwardly facing cam surface at each end of said driving element, each of said driving element cam surfaces registering vertically with an element on the locking bar when the driving element of the lost-motion device is moved to position to bring such cam surface into vertical registry with such element on the locking bar, and each such cam being formed for engagement with the element on the locking bar and movement of the locking bar and the locking bar interfering means without vertical movement of the door from a position of engagement with the cooperating door movement interfering means on the door to a position of non-engagement with such cooperating door movement interfering means during lost-motion movement of the driving element with respect to the driven element in the direction of drive of said driving element.

2. Means as specified in claim 1, wherein the cam surface at the trailing end of the driving element of the lost-motion device for door movement in either direction occupies position with a low point of such cam surface in vertical registry with the cam engaging element on the locking bar when the door and said driving element are at their terminal positions corresponding to door movement in such direction.

3. Means as specified in claim 2, together with friction means interposed between the driving and driven elements of said lost-motion device.

4. Means as specified in claim 3, wherein said friction means is adjustable to adjust the amount of friction between the driving and driven elements of the lost-motion device.

5. Means as specified in claim 2, wherein the means to drive the driving element in either direction of travel includes a flexible tension element, connections between the ends of said tension element and the driving element of the lost-motion device, and stationary guide elements for the flexible tension element, said guide elements being separated from each other a distance at least as great as the amount of door travel between door closed and door opened terminal positions.

6. Means as specified in claim 5, together with a tension connection between each end of the tension element and the proximate end of the driving element of the lost-motion device, each such tension element connection including a yieldable element between the end of the tension element and the driving element of the lost-motion device.

7. In a door locking and controlling construction, the combination of a door, means to support said door for movements in a path back and forth between a door closed and locked closed position and a door opened and locked open position, a locking bar adjacent to the path of movement of the door, means to support said locking bar for vertical movement in a path between a door locking position and a door unlocking position, a door locking element on the locking bar, two abutments connected to the door corresponding to the door closed and locked closed position and to the door opened and locked open position, said abutments being positioned for travel with the door in paths adjacent to the door locking element of the locking bar during the movements of the door to its locked closed position and its locked open position and the door locking element of the locking bar being engageable with said abutments selectively when the locking bar is in its door locking position with the door in its door closed position or its door open position, respectively, and said door locking element of the locking bar being non-engageable with either of said abutments when the locking bar is in its door unlocking position, reversible driving means to drive the door in either its opening or its closing direction, selectively, a lost motion device including a driving element and a driven element and means to limit the amount of lost motion between said elements, driving connections between the reversible driving means and the driving element of the lost motion device, door driving connections between the driven element of the lost motion device and the door, locking bar moving means connected to the driving element of the lost motion device and engageable with an element connected to the said locking bar and effective to move the locking bar to its door unlocking position at commencement of movement of said driving element of the lost motion device for door movement in either direction, a manual key locking unit adjacent to the locking bar, interconnections between an element of said key locking unit and the locking bar effective to move the locking bar to its door unlocking position by key operation and permitting movement of the locking bar to its door unlocking position by movement of the driving element of the lost motion device without key locking unit control, a control bar, means to support said control bar adjacent to the locking bar for movement in a direction non-parallel to the path of movement of the locking bar, said control bar being movable between a first control bar position, a second control bar position, and a third control bar position, said first control bar position being a driving means door driving operation position, said second control bar position being a key operation position, and said third control bar position being an emergency release position, an interlock unit located adjacent to the paths of travel of the driving element of the lost motion device, and adjacent to the paths of travel of the locking bar and of the control bar, means to movably support said interlock unit in said location and to urge said unit to move to a non-operated first defined interlock unit position, cooperating elements on said interlock unit and the locking bar constituted for cooperation with each other when the interlock unit is in its first defined interlock unit non-operated position, said elements being constituted when in said first defined interlock unit position to lock the locking bar against movement from its door locking position, cooperating elements on said interlock unit and the driving element of the lost motion device, said elements being constituted for cooperation with each other when said driving element moves in direction to commence door opening operation to move the interlock unit to a second defined interlock unit position, said second defined interlock unit position being a position of non-locking engagement of the interlock unit with the locking bar, and permitting movement of the locking bar from its door locking position, the interlock unit and the element of the locking bar which cooperates with the interlock unit being constituted for movement of the interlock unit from said second defined interlock unit positioned to a third defined interlock unit position during movement of the locking bar in the unlocking direction, said third defined interlock unit position being a position of non-cooperation of the interlock unit and the driving element of the lost motion device, said cooperating elements of the locking bar and the interlock unit being constituted to retain the interlock unit in said third defined interlock unit position of non-cooperation of the interlock unit and the driving element of the lost motion device during door closing movement to the door closed position, cooperating elements on said control bar and the interlock unit effective to move the interlock unit to said second defined interlock unit position when the control bar is in said second control bar defined key operation position, and cooperating elements on said control bar and the locking bar effective to move the locking bar to the door unlocked position when the control bar is in said third defined control bar position, said cooperating elements which are on the control bar and the interlock unit retaining the interlock unit in said second defined interlock unit position when the control bar is in said second defined key operation position.

8. Mechanism as defined in claim 7, wherein said interlock unit comprises a rotatable element, and wherein said means to movably support said interlock unit comprises a pivotal mounting for said rotatable element wherein the axis of rotation of said element extends in direction non-parallel to the direction of movement of the driving element of the lost motion device and non-parallel to the locking and unlocking movements of the locking bar and non-parallel to the movements of the control bar, and wherein the pivotal mounting of the interlock unit is non-centric with the center of gravity of the interlock unit, and wherein the non-operated first defined interlock unit position of the interlock unit is the position of such unit in which the center of gravity of such unit is at substantially its lowest position with respect to such pivotal mounting.

9. Means as defined in claim 8, wherein the axis of rotation of the interlock unit extends substantially normal to the direction of movement of the driving element of the lost motion device, and substantially normal to the direction of movements of the locking bar, and substantially normal to the direction of movements of the control bar.

10. Means as defined in claim 9, wherein the cooperating elements on the interlock unit and the locking bar which are constituted for cooperation with each other when the interlock unit is in its non-operated first defined interlock unit position for locking the locking bar against movement from its door locking position, comprise a lug element connected to the locking bar and extending outwardly therefrom, and the edge of the interlock unit when said interlock unit is in its non-operated first defined interlock unit position.

11. Means as defined in claim 9, wherein the cooperating elements on the interlock unit and the driving element of the lost motion device comprise a lug element connected to the interlock unit and extending substantially parallel to the axis of rotation thereof, and another lug element connected to the driving element of the lost motion device and extending towards the axis of rotation of the interlock unit a distance such that during movement of the driving element of the lost motion device during door opening movement said lug moves through the location of the interlock unit lug when such interlock unit is in its first defined interlock unit position with production of rotation of the interlock unit during such movement of the driving element of the lost motion device, to the second defined interlock unit position of such interlock unit.

12. Means as defined in claim 11, wherein said lug elements which are connected to the interlock unit and to the driving element of the lost motion device are constituted to disengage from each other during door opening movement of the driving element of the lost motion device after the interlock unit has been moved to said second defined interlock unit position.

13. Means as defined in claim 12, wherein the locking bar moving means which is connected to the driving element of the lost motion device acts to raise the locking bar to its door unlocking position during movement of the driving element lug through the location of the interlock unit lug with consequent unlocking movement of the locking bar while the interlock unit is away from its non-operated first defined interlock unit position.

14. Means as defined in claim 13, wherein the cooperating elements of the locking bar and the interlock unit retain said interlock unit in said third defined interlock unit position of non-cooperation of the interlock unit and the driving element of the lost motion device during the door closing movement to the door closed position.

15. Means as defined in claim 8, wherein the cooperating elements on the control bar and the interlock unit which are effective to move the interlock unit to said second defined interlock unit position when the control bar is in said second defined key operation position comprise a lug element connected with and travelling with the control bar, and a part on the interlock unit in the path of travel of said lug element, said lug element and said part being relatively located for angular displacement of the interlock unit by engagement of said lug element with said part during movement of the control bar from said first defined control bar position to said second defined control bar position, said angular displacement being of amount to move the interlock unit from said first defined interlock unit non-operated position to said second defined interlock unit position.

16. Means as defined in claim 15, wherein said cooperating elements on the control bar and the locking bar which are effective to move the locking bar to the door unlocked position when the control bar is in said third defined control bar position, comprise a projection connected to the locking bar adjacent to the control bar, and a cam element connected to the control bar in position to raise the locking bar to its unlocking position during control bar movement from the second defined control bar position to the third defined control bar position, and wherein the lug element which is connected to and travels with the control bar includes a dwell surface in position to engage the part of the interlock unit which is engaged by said lug during movement of the control bar between said second and third defined control bar positions and retain the interlock unit in said second defined interlock unit position.

References Cited in the file of this patent
UNITED STATES PATENTS

| | | |
|---|---|---|
| 845,731 | Eskilsson | Feb. 26, 1907 |
| 1,361,221 | Bentley | Dec. 7, 1920 |
| 1,649,797 | Winn | Nov. 15, 1927 |
| 2,003,399 | Tamsitt | June 4, 1935 |
| 2,009,342 | Nielsen | July 23, 1935 |
| 2,148,521 | Adam | Feb. 28, 1939 |
| 2,184,774 | Browning | Dec. 26, 1939 |
| 2,262,674 | Hart et al. | Nov. 11, 1941 |
| 2,288,666 | Adam | July 7, 1942 |
| 2,686,577 | Hoppenjans | Aug. 17, 1954 |